(12) United States Patent
Zeng et al.

(10) Patent No.: US 7,016,983 B2
(45) Date of Patent: Mar. 21, 2006

(54) SYSTEM AND METHOD FOR CONTROLLING A COMMUNICATION BUS

(75) Inventors: Qinggang Zeng, Fremont, CA (US); Weibin Li, Pleasanton, CA (US)

(73) Assignee: ESS Technology, Inc., Fremont, CA (US)

( * ) Notice: Subject to any disclaimer, the term of this patent is extended or adjusted under 35 U.S.C. 154(b) by 19 days.

(21) Appl. No.: 10/411,716

(22) Filed: Apr. 12, 2003

(65) Prior Publication Data

US 2004/0215833 A1    Oct. 28, 2004

(51) Int. Cl.
*G06F 3/00*    (2006.01)
(52) U.S. Cl. .............................. 710/5; 710/20; 710/21; 712/32; 712/214; 712/225
(58) Field of Classification Search ............ 710/62–68; 386/109–112
See application file for complete search history.

(56) References Cited

U.S. PATENT DOCUMENTS 5,892,983 A * 4/1999 Tozaki et al. ................. 710/68
5,953,513 A * 9/1999 Saiki et al. ................... 710/62
6,754,439 B1 * 6/2004 Hensley et al. ............. 386/111
6,763,429 B1 * 7/2004 Hirayama ................... 711/112
6,807,363 B1 * 10/2004 Abiko et al. .................. 386/68

* cited by examiner

*Primary Examiner*—Kim Huynh
*Assistant Examiner*—Eron Sorrell
(74) *Attorney, Agent, or Firm*—Farjami & Farjami LLP

(57) ABSTRACT

A method for controlling communication. The method sends a first instruction from a first processor to a first device via a processor bus in electrical communication with a first bus, sends a control signal from the first processor to a selector, the selector switching electrical communication at least one signal line of the processor bus from the first bus to a second bus, sends a second instruction from the first processor to a second device, sends a control signal from the first processor to the selector, the selector switching electrical communication of the at least one signal line of the processor bus from the second bus to the first bus, and sends data from the first device to the first processor. In another aspect, the first processor may transmit the control signal to the selector after comparing a threshold value with a status signal indicating an amount of data stored in the buffer connected to the second processor, the status signal sent from the second processor to the first processor via a status bus.

22 Claims, 3 Drawing Sheets

SYSTEM AND METHOD FOR CONTROLLING A COMMUNICATION BUS

BACKGROUND

1. Technical Field

The present disclosures relates to a system and method for controlling a communication bus. More specifically, the present disclosure relates to a system and method for controlling a communication bus using a processor controlled selector.

2. Description of the Related Art

A media system, such as a digital video recorder (DVR), may record audio/video data onto a fixed or portable storage media, for example, a hard disk or recordable optical storage media, and may reproduce audio/video data stored therein. When recording data, a DVR may receive audio/video data from an input signal, for example, a television signal, then compress and record that signal onto a storage medium. When reproducing data, a DVR may accommodate storage media, for example, a digital versatile disk (DVD), in order to access included encoded audio/video data. In certain instances, a user may wish to play back audio/video data stored on a DVD while recording an input signal onto another storage medium. Therefore, it is desirable to have a system that can provide access to multiple peripheral devices.

FIG. 3 shows the architecture of a related system including a Host Processor 100, Hard Disk 130, Optical Disk Drive 160, field programmable gate array (FPGA) 140, Encoder Processor 150, Data Buffer 155 and Advanced Technology Attachment-2 (ATA-2) bus 200.

When DVD playback is selected, the Host Processor 100 sends the appropriate ATAPI commands to the Optical Disk Drive 160 containing the DVD. The Optical Disk Drive 160 responds to those commands, accesses the DVD, and sends audio/video data to Host Processor 100 via the ATA2 bus 200. The Host Processor 100 then processes the audio/video data and outputs an audio/video signal. When the DVR records an input audio/video signal to the Hard Disk 130, the Host Processor 100 first sends commands to the Hard Disk 130 through the ATA2 bus 200. The Hard Disk 130 then receives coded data from the Encoder Processor 150, which encodes an input audio/video signal into coded data, with support of the FPGA 140 and Data Buffer 155, via ATA2 bus 200.

When the DVR plays a DVD and records an input audio/video signal simultaneously, the Hard Disk 130 and the Optical Disk Drive 160 must share the ATA2 bus 200.

The Encoder Processor 150 cooperates with a Data Buffer 155 for temporarily storing the coded data before it is transmitted to the Hard Disk 130. In order to avoid Data Buffer 155 overflow, the Host Processor 100 sends commands to Hard Disk 130 to retrieve the coded data from the Data Buffer 155.

The Optical Disk Drive 160 may take longer to execute and respond to ATAPI commands than Hard Disk 130, for example, from several hundred milliseconds to one second. According to the ATA2 standard, only one ATA2 device may communicate via the ATA2 bus at any time. In the example shown in FIG. 3, only one device may communicate with the Host Processor 100 over the ATA2 bus 200 at a time. As a result, the Optical Disk Drive 160 may communicate via the ATA2 bus 200 for a period of time such that the Host Processor 100 cannot send out the appropriate ATA2 command to the Hard Disk 130 in time to retrieve the coded data from the Encoder Processor 150 before the Data Buffer 155 overflows.

In one solution to the buffer overflow problem, known as overlapping operation, the Host Processor 100 may suspend communication with the Optical Disk Drive 160, so that it may communicate with the Hard Disk 130 while the slower Optical Disk Drive 160 executes an ATAPI command.

While the ATA2 specification includes support for overlapping operation, in practice it is supported by few Optical Disk Drives 160. According to the ATA2 specification, attached devices share the ATA2 bus. Before the Host Processor 100 communicates with a device, the Host Processor 100 sends a selection command to all attached devices identifying the device with which the Host Processor 100 intends to communicate. While all attached devices receive the command, only the selected device will respond to any following commands.

In an Optical Disk Drive 160 supporting overlapping operation, during the overlapping period, the Optical Disk Drive 160 will voluntarily release the ATA2 bus while executing a command, allowing the Host Processor 100 to communicate with other devices. The ATA2 specification includes a protocol for the Optical Disk Drive 160 to decide when to release the ATA2 bus and how to communicate with the Host Processor 100 to take back the bus in order to avoid conflict on the bus. This type of Optical Disk Drive 160 is capable of freeing the ATA2 bus while executing command without assistance of outside circuits.

Because many devices do not support overlapping operation, it is therefore desirable to provide a system and method for overlapping operation that may be used with all devices having an ATA2 interface.

SUMMARY

The present disclosure relates to a method for controlling communication, comprises, sending a first instruction from a first processor to a first device via a processor bus in electrical communication with a first bus, sending a control signal from the first processor to a selector, the selector switching electrical communication at least one signal line of the processor bus from the first bus to a second bus, sending a second instruction from the first processor to a second device, sending a control signal from the first processor to the selector, the selector switching electrical communication of the at least one signal line of the processor bus from the second bus to the first bus, and sending data from the first device to the first processor. The steps of sending a control signal may be performed after comparing a threshold value with a status signal indicating an amount of data stored in the buffer connected to the second processor, the status signal sent from the second processor to the first processor via a status bus

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
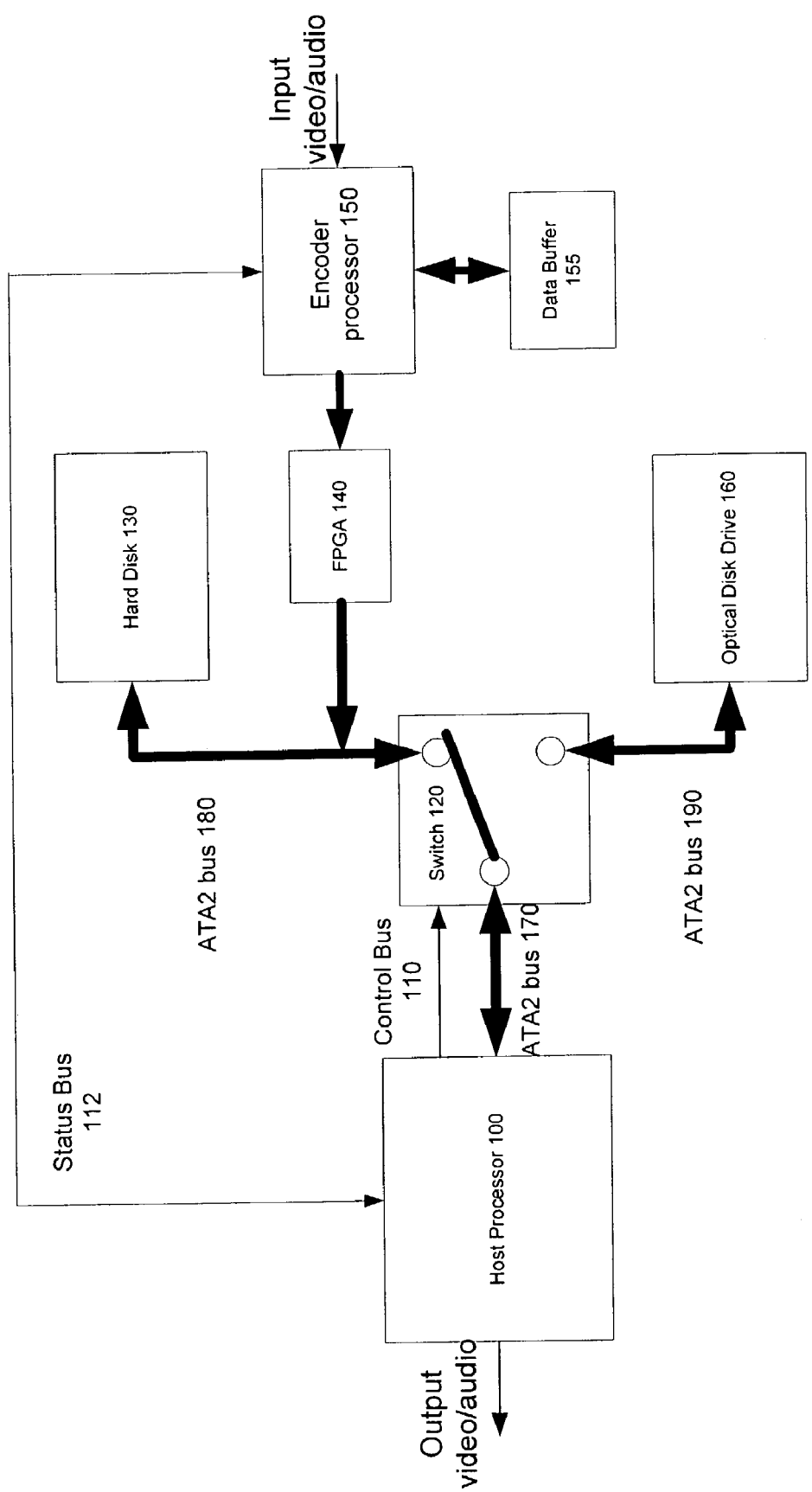
FIG. 1 shows a block diagram of a system for controlling communication on a bus according to an embodiment of the present disclosure.

In describing a preferred embodiment of the present disclosure illustrated in the drawings, specific terminology is employed for sake of clarity. The present disclosure is not intended to be limited to the specific terminology so selected, and it is to be understood that each specific element includes all technical equivalents which operate in a similar manner.

As shown in FIG. 1, the system and method of the present disclosure may include a Switch 120 connected to a Host Processor 100 via a bus, for example, ATA2 bus 170. The Switch 120 may be controlled by the Host Processor 100 via a Control Signal transmitted via Control Bus 110 for controlling access to one or more signals of the ATA2 bus 170, thereby providing overlapping operation. In one aspect of the system and method of the present disclosure, one terminal of the Switch 120 may be connected to one or more devices, for example, a Hard Disk 130 and an FPGA 140/Encoder Processor 150 via ATA2 bus 180, while another terminal of the Switch 120 may be similarly connected to one or more devices, for example, an Optical Disk Drive 160 via ATA2 bus 190. The Host Processor 100 may be connected to the Encoder Processor 150 via a Status Bus 112. In another aspect of the system and method of the present disclosure, the Switch 120 may be, for example, an electronic switch including logic circuits which may be located, for example, in an FPGA separate from FPGA 140.

While the Optical Disk Drive 160 executes an ATAPI command, the Host Processor 100 may set the Switch 120 so that the Host Processor 100 may communicate with the Hard Disk 130 via the ATA2 bus 180. When this communication between the Host Processor 100 and the Hard Disk 130 is complete, the Switch 120 may be set so that the Optical Disk Drive 160 may communicate with the Host Processor 100.

Figure 2:
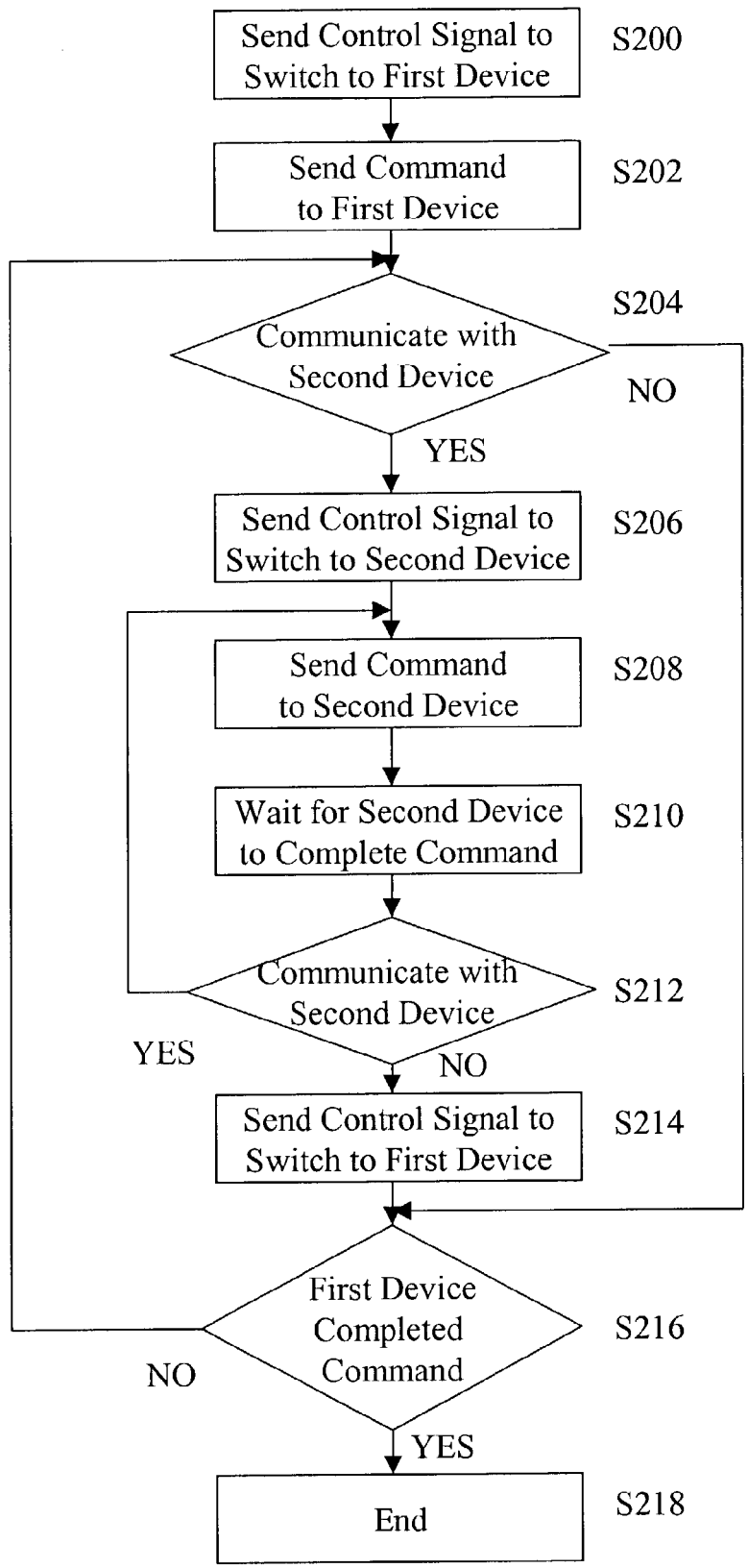
FIG. 2 shows a flowchart of a system for controlling communication on a bus according to an embodiment of the present disclosure.
Figure 3:
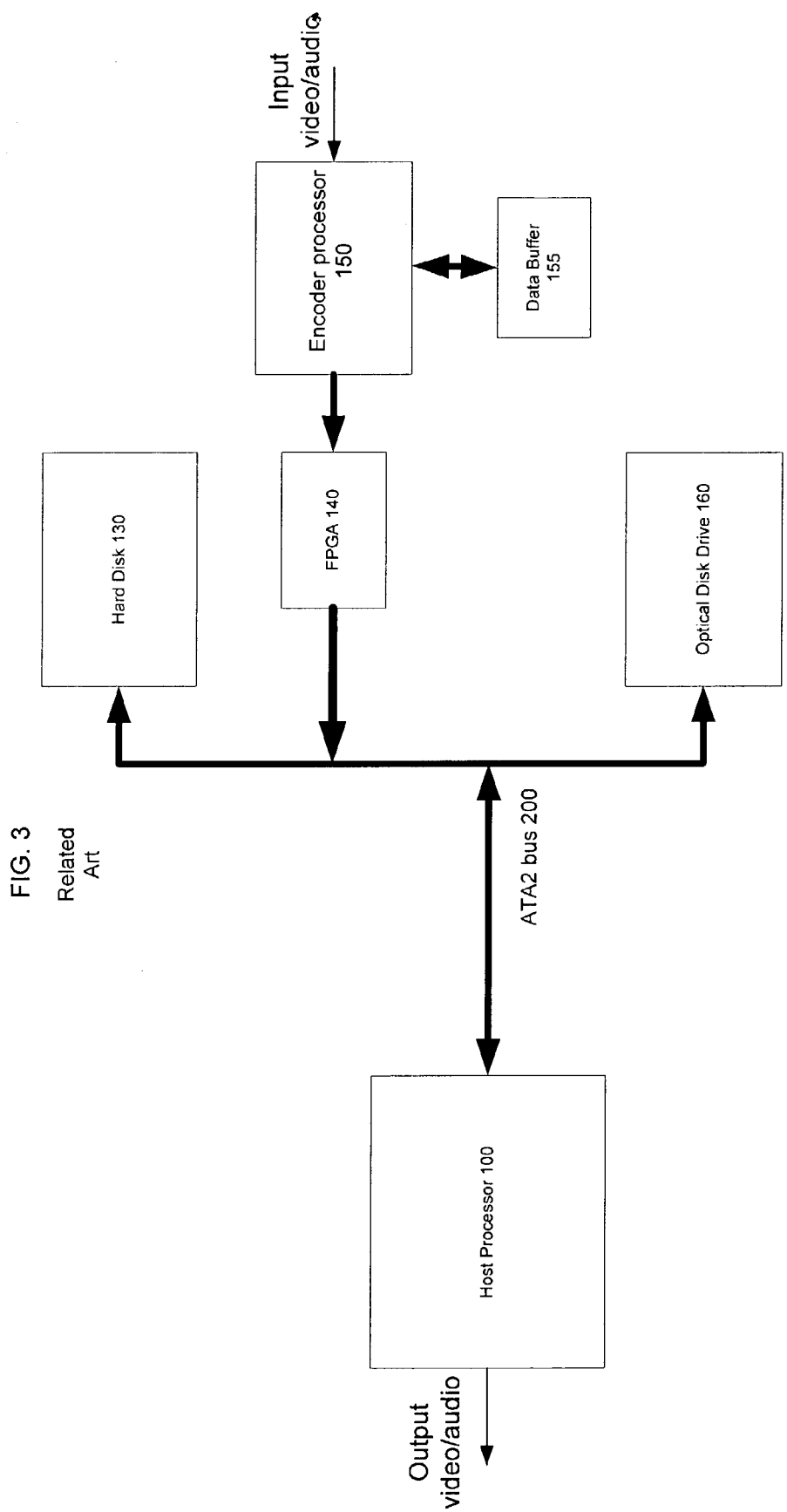
FIG. 3 shows an example of a related system.

FIG. 2 shows a flowchart according to one aspect of the system and method of the present disclosure. It is assumed in this example that simultaneous data playback from Optical Disk Drive 160 and storage to Hard Disk 130 has been requested.

In Step S200, the Host Processor 100 may send a Control Signal via Control Bus 110 to actuate the Switch 120, which may place in electrical communication ATA2 bus 170 and ATA2 bus 190, thereby making the one or more switched ATA2 bus signals from the Host Processor 100 available to the Optical Disk Drive 160 and not to the Hard Disk 130. In one aspect of the system and method of the present disclosure, the Control Bus 110 may be a single data line, and the Control Signal may be a logical '1' or '0' with each corresponding to a switch position. It will be understood by one skilled in the art that any of a number of signaling schemes may be implemented by the Host Processor 100 to control Switch 120 via Control Bus 110.

There are 40 signals on the ATA2 bus, including two chip selects (CS0, CS1); three device addresses (DA2, DA1 and DA0); device active (DASP); 16 device data (DD0–DD15); device I/O read (DIOR); device I/O write (DIOW); DMA acknowledge (DMACK); DMA request (DMARQ); device interrupt (INTRQ); device 16-bit I/O (IOCS 16); I/O channel ready (IORDY); passed diagnostics (PDIAG); device reset (RESET); spindle synchronization/cable select (SPSYNC:CSEL); 7 Ground; 1 Reserved. Some devices may operate in response to signals transmitted via the ATA2 bus only when one or more specific signals are presented to those devices. In one aspect of the system and method of the present disclosure, in response to the Control Signal sent via Control Bus 110, the Switch 120 may switch one signal, for example, a device select signal, such as CS0, from ATA2 bus 170 between the ATA2 bus 180 and the ATA2 bus 190.

In another aspect of the system and method of the present disclosure, the Switch 120 may switch one or more signals of the ATA2 bus 170, including, for example, the following: CS0, CS1, DIOW, DIOR, DMACK, DMARQ, INTRQ, IOCS16, and IORDY.

According to another aspect of the system and method of the present disclosure, the Switch 120 may switch one or more of the control signals, address signals, data signals and miscellaneous signals of ATA2 bus 170 including, for example, the following: CS0, CS1, DIOW, DIOR, DMACK, DMARQ, INTRQ, IOCS16, IORDY, DA2, DA1, DA0, DASP, DD0–DD15, PDIAG, RESET, and spindle synchronization/cable select.

According to yet another aspect of the system and method of the present disclosure, the Switch 120 may switch all signals of the ATA2 bus 170.

The remaining unswitched signals of the ATA2 bus 170, if any, may be connected to both ATA2 bus 180 and ATA2 bus 190.

In Step S202, the Host Processor 100 processor may issue a command, for example, a 'Play' or 'Read' command, to the Optical Disk Drive 160. Due to the characteristics of the Optical Disk Drive 160, for example, data access times, data requested from the Optical Disk Drive 160 may not be available for a period of time anywhere from, for example, several hundred milliseconds to one second. During this time period, the Host Processor 100 may communicate with other devices, such as the Hard Disk 130, as described below.

In Step S204, the Host Processor 100 determines whether it will communicate with the Hard Disk 130. In one aspect of the system and method of the present disclosure, the Host Processor 100 may make this determination based on the amount of data present in Data Buffer 155. The Host Processor 100 may send a status check command via a Status Bus 112 to a Host Port of the Encoder Processor 150 which may respond with a Reply Signal, indicating the amount of data currently stored in the Data Buffer 155, for example, in bytes. The Host Processor 100, upon receiving the Reply Signal, may compare the amount indicated in the Reply Signal with a Threshold Amount. In one aspect of the system and method of the present disclosure, the Host Processor 100 will communicate with the Hard Disk 130 if the amount of data stored in the Data Buffer 155 is greater than the Threshold Amount.

In another aspect of the system and method of the present disclosure, the Threshold Amount may be selected from a group of predetermined amounts based on the current encoding bit rate of the Encoder Processor 150, and as the encoding bit rate increases, a larger Threshold Amount may be selected. An example of encoding bit rates and corresponding Threshold Amounts is shown in Table 1 below.

TABLE 1

Encoding Bit Rates and Corresponding Threshold Amounts

| Encoding Bit Rate (Mbits/second) | Threshold Amount (in 256 byte units) |
|---|---|
| 8 Mbits/sec | 500 |
| 6 Mbits/sec | 466 |
| 4 Mbits/sec | 278 |
| 2.2 Mbits/sec | 224 |

If the Host Processor 100 determines that it will operate the Hard Disk 130 (Yes, Step S204), in Step S206 the Host Processor 100 may send a Control Signal via Control Bus 110 to the Switch 120, which actuates and places in electrical communication ATA2 bus 170 and ATA2 bus 180, thereby making one or more signals from Host Processor 100 available to the Hard Disk 130 and not to the Optical Disk Drive 160. If the Host Processor 100 determines that it will not operate the Hard Disk 130, (No, Step S204), the system moves to Step S216.

In Step S208, the Host Processor 100 may send a command to the Hard Disk 130 via ATA2 bus 180 where it is executed. The command may involve, for example, retrieving coded data from the Encoder Processor 150 and Data Buffer 155 and storing the data on Hard Disk 130 through handshake logics in FPGA 140. In one aspect of the system and method of the present disclosure, the Hard Disk 130 may retrieve data using direct memory access (DMA), which allows data to be sent directly from one device to another without action by a processor. In this example, after receipt of the command, the Hard Disk 130 may issue a data request signal (DRQ) to FPGA 140 which will handshake with the Encoder Processor 150 to get data from the Data Buffer 155, then the data will be written to Hard Disk 130 by FPGA 140 as DMA data transfer mode.

In Step S210, the Host Processor 100 waits for a signal, for example an interrupt, from the Hard Disk 130 via ATA2 bus 180 indicating completion of the command sent in Step S208.

In Step S212, the Host Processor 100 determines whether to continue communicating with Hard Disk 130 via ATA2 bus 180 or switch back to ATA2 bus 190 connected to the Optical Disk Drive 160. This determination may be made in a manner similar to the determination made in Step S204. If further communication is desired between the Host Processor 100 and the Hard Disk 130, (Yes, Step S212), then the system returns to Step S208.

If no further communication is desired between the Host Processor 100 and the Hard Disk 130, (No, Step S212), then in Step S214, the Host Processor 100 may send a Control Signal via Control Bus 110 to the Switch 120, which actuates and places in electrical communication one or more signals of ATA2 bus 170 and ATA2 bus 190, thereby making one or more signals from Host Processor 100 available to the Optical Disk Drive 160 and not to the Hard Disk 130.

When a device, for example, the Optical Disk Drive 160, completes a command, for example, a play or read command, the device may indicate completion by sending a signal, for example, an interrupt signal via ATA2 bus 190. In one aspect of the system and method of the present disclosure, when the Host Processor 100 receives such a signal from the Optical Disk Drive 160, it may interpret that signal as evidence of command completion, and may, in this example, prepare to receive data read from the optical disk. In another aspect of the system and method of the present disclosure, after receiving a first signal, the Host Processor 100 may query the device regarding status.

If the Host Processor 100 determines that the Optical Disk Drive 160 has completed the command sent in Step S202, (Yes, Step S216), then the Host Processor 100 may communicate further with the Optical Disk Drive 160, before the process ends in Step S218. In one aspect of the system and method of the present disclosure, the Host Processor 100 may check the status of the Optical Disk Drive 160, and send a confirmation to the Optical Disk Drive 160, which, in response, may send the data read from the optical disk.

If the Optical Disk Drive 160 has not completed the command sent in Step S202 (No, Step S216), then, as described above, the system moves to Step S204.

Numerous additional modifications and variations of the present disclosure are possible in view of the above-teachings. It is therefore to be understood that within the scope of the appended claims, the present disclosure may be practiced other than as specifically described herein

The invention claimed is:

1. A system for controlling communication, comprising:
a first processor connected to a selector via a processor bus and a control bus;
the selector placing one or more signal lines of the processor bus in electrical communication with one or more signal lines of one of a first bus and a second bus, the selector responsive to a control signal sent from the first processor via the control bus;
a first device connected to the first bus for accessing a storage medium in response to a first instruction from the first processor;
a second processor connected to the second bus, the second processor having an input for receiving data and attached to a buffer for storing data; and
a second device connected to the second bus, which retrieves and stores the data from the buffer in response to a second instruction from the first processor;
wherein the first processor is configured to issue the first instruction to the first device via the first bus causing the first device to access the storage medium, wherein while the first device is performing according to the first instruction, the first processor transmits the control signal to the selector to select the second bus, and the first processor issues the second instruction to the second device via the second bus causing the second device to retrieve and store the data from the buffer, and wherein after the second device completes performance in accordance to the second instruction, the first processor transmits the control signal to the selector to select the first bus to communicate with the first device relating to the first instruction.

2. The system of claim 1, wherein the first processor transmits the control signal to the selector to select the second bus after comparing a threshold value with a status signal indicating an amount of data stored in the buffer connected to the second processor, the status signal sent from the second processor to the first processor via a status bus.

3. The method of claim 2, wherein the threshold value is selected from a group of one or more threshold values based on an encoding rate.

4. The system of claim 1, wherein the first processor transmits the control signal to the selector to select the second bus in response to a signal sent from the second device.

5. The system of claim 1, wherein the processor bus, the first bus and the second bus are Advanced Technology Attachment-2 (ATA-2) busses.

6. The system of claim 1, wherein the first device is an optical disk drive.

7. The system of claim 1, wherein the second device is a hard disk drive.

8. The system of claim 1, wherein the selector is a field programmable gate array.

9. The system of claim 1, wherein the second processor is an encoder processor.

10. The system of claim 1, wherein the data is audio/video data.

11. A method for controlling communication, comprising:
a) sending a first instruction from a first processor to a first device via a processor bus in electrical communication with a first bus;
b) while the first device is performing according to the first instruction, sending a control signal from the first processor to a selector, the selector switching electrical communication of at least one signal line of the processor bus from the first bus to a second bus;

c) sending a second instruction from the first processor to a second device via the second bus;

d) after the second device completes performance in accordance to the second instruction, sending a control signal from the first processor to the selector, the selector switching electrical communication of the at least one signal line of the processor bus from the second bus to the first bus; and e) sending data from the first device to the first processor to complete the first instruction.

12. The method of claim 11, wherein steps b) through d) are performed after comparing a threshold value with a status signal indicating an amount of data stored in a buffer connected to a second processor, the status signal sent from the second processor to the first processor via a status bus.

13. The method of claim 12, wherein the threshold value is selected from a group of one or more threshold values based on an encoding rate.

14. The method of claim 11, wherein the first instruction is a request to retrieve audio/video data from the first device, and the data sent from the first device is the requested audio/video data.

15. The method of claim 11, wherein the second instruction is a request for the second device to retrieve and store audio/video data from a buffer.

16. The method of claim 11, wherein the processor bus, the first bus and the second bus are Advanced Technology Attachment-2 (ATA-2) busses.

17. The method of claim 11, wherein the first device is an optical disk drive.

18. The method of claim 11, wherein the second device is a hard disk drive.

19. The method of claim 11, wherein the second processor is an encoder processor.

20. The method of claim 11, wherein the selector is a field programmable gate array.

21. A system for controlling communication, comprising:

a first processor connected to a selector via a processor bus and a control bus;

the selector connected to a first bus and a second bus, the selector in one of a first position, a second position, and a third position based on a control signal sent from the first processor via the control bus;

a first device connected to the first bus and configured to receive a first instruction from the first processor;

a second processor connected to the second bus; and a second device connected to the second bus and configured to receive a second instruction from the first processor;

wherein the first processor is configured to issue the first instruction to the first device via the first bus causing the first device to perform a task, wherein while the first device is performing the task according to the first instruction, the first processor transmits the control signal to the selector to select the second bus, and the first processor issues the second instruction to the second device via the second bus causing the second device to perform a second task, and wherein after the second device completes the second task in accordance to the second instruction, the first processor transmits the control signal to the selector to select the first bus to communicate with the first device relating to the first instruction.

22. The system of claim 21, wherein, the first position includes one or more signal lines of the processor bus in electrical communication with one or more signal lines of the first bus, the second position includes one or more signal lines of the processor bus in electrical communication with one or more signal lines of the second bus, and the third position includes one or more signal lines of the processor bus in electrical communication with one or more signal lines, of the first bus.

* * * * *